United States Patent Office 2,972,860
Patented Feb. 28, 1961

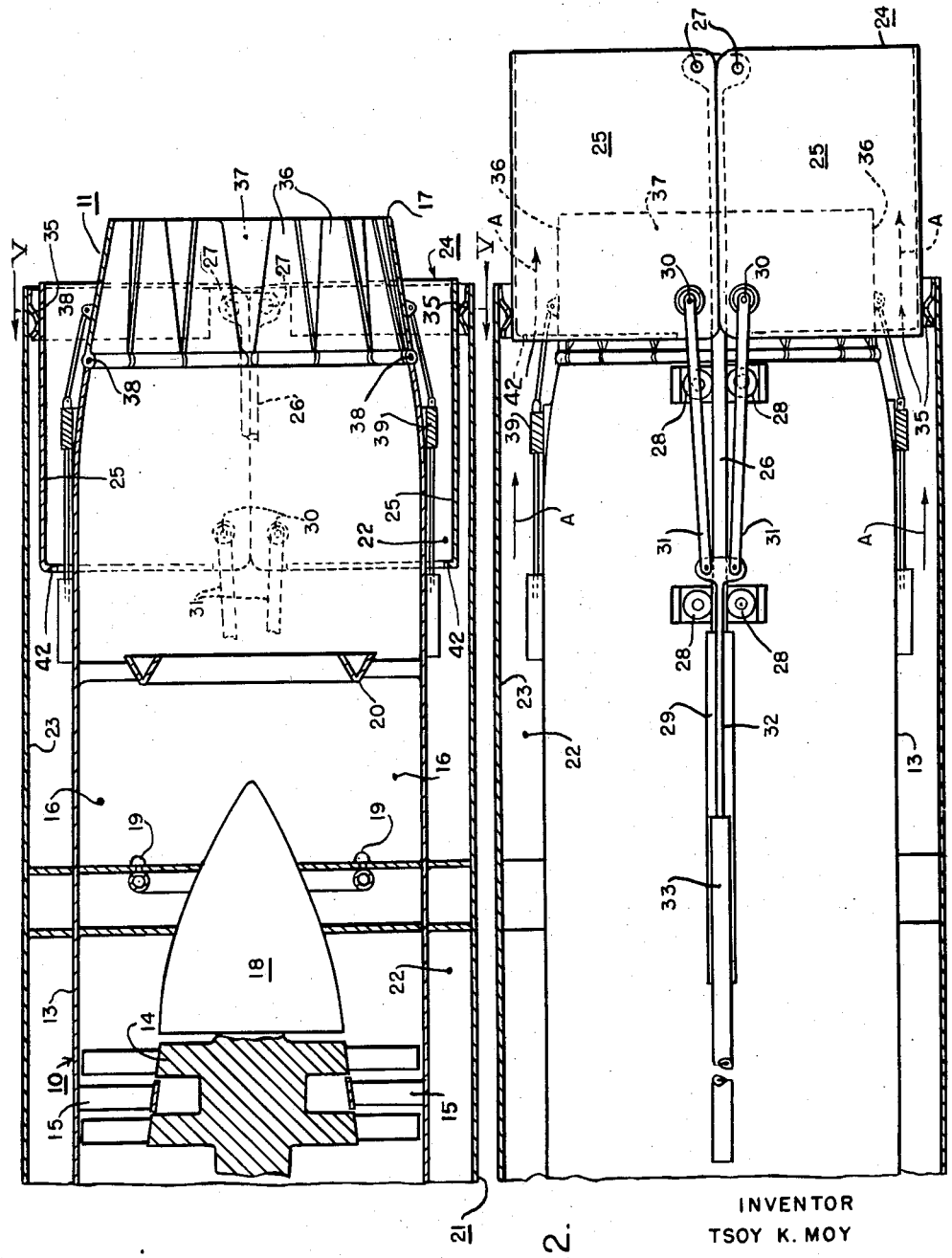

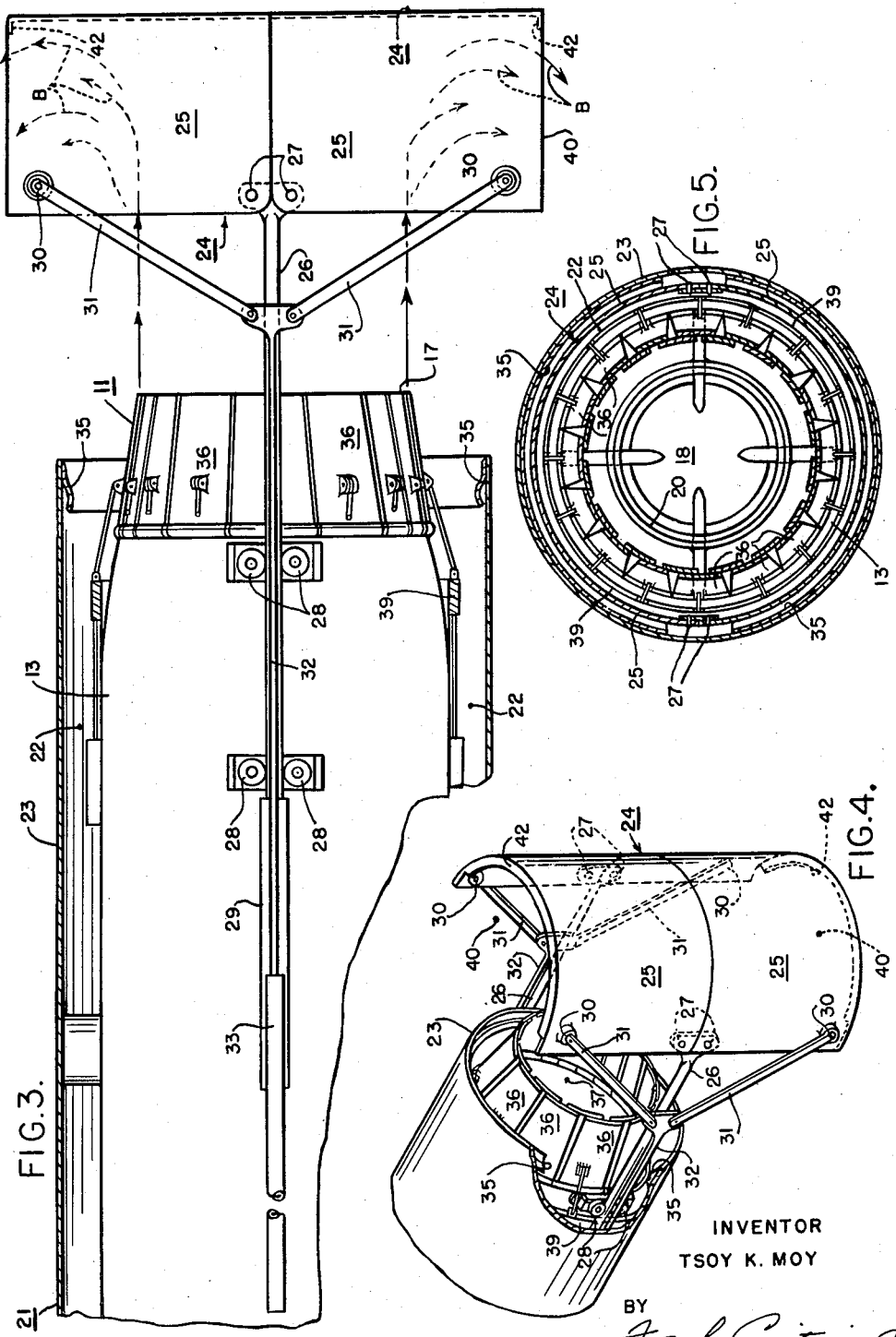

2,972,860

COMBINED VARIABLE EJECTOR AND THRUST REVERSER

Tsoy K. Moy, San Jose, Calif., assignor to Westinghouse Electric Corporation, East Pittsburgh, Pa., a corporation of Pennsylvania Filed Jan. 30, 1958, Ser. No. 712,156

4 Claims. (Cl. 60—35.55)

This invention relates to aviation jet propulsion engines, more particulary to exhaust nozzle structure employed therein for controlling the direction and flow of the exhaust gases ejected therefrom, and has for an object to provide improved structure of this type.

In the aviation jet propulsion engine art, numerous exhaust nozzle arrangements have heretofore been proposed for destroying the forward thrust of the exhaust gases by deflecting the gas stream and/or blocking the rearwardly directed nozzle opening. Such arrangements, while generally effective, are often of quite complicated construction and in some instances impose undesirable additional drag on the engine when in the stand-by condition.

In accordance with the invention, an aviation jet propulsion engine, having a tubular inner casing defining a primary gas passageway and having a variable area exhaust nozzle for ejecting the gases in rearward direction, is provided with tubular outer shell structure disposed in encompassing spaced relation with the inner casing and jointly therewith defining an annular bypass air flow passage communicating with the ambient atmosphere downstream of the exhaust nozzle.

The outer shell structure comprises a fixed shell portion and an ejector shell portion slidably received within the fixed shell for axial movement in fore and aft direction.

The variable exhaust nozzle and the ejector shell portion are jointly operable by suitable actuators in such a manner that as the area of the exhaust nozzle is reduced the ejector shell portion is moved in forward direction to shorten the effective length of the outer shell structure, as required for non-afterburning operation of the engine. Conversely, as the area of the exhaust nozzle is increased, the ejector shell portion is moved in rearward direction to increase the effective length of the outer shell structure, as required for afterburning operation of the engine.

The ejector shell portion is divided into two semi-cylindrical segments pivotally connected to each other at their downstream end portions for rotation in opposite directions about an axis normal to the axis of the engine and are jointly controlled by suitable actuator and linkage structure. The ejector shell portions are normally restrained against rotation by the fixed shell but are rotatable to the thrust reversing position, after disengagement therefrom, by further movement in rearward direction. In the rotated position, the segments are disposed in end-to-end abutment and extend across the path of the gas stream ejected by the exhaust nozzle, thereby defining oppositely disposed lateral openings for ejecting the gases laterally with a forwardly directed component.

The foregoing and other objects are effected by the invention as will be apparent from the following description and claims taken in connection with the accompanying drawings, forming a part of this application, in which:

Fig. 1 is an axial sectional view of the aft end of an afterburning aviation turbojet engine having exhaust nozzle structure incorporating the invention, the engine being shown in the non-afterburning position;

Fig. 2 is a side elevational view similar to Fig. 1 with some parts in section and illustrating the engine in the afterburning position;

Fig. 3 is a side elevational view with some portions in section and illustrating the exhaust nozzle structure in the thrust reversing position;

Fig. 4 is a fragmentary perspective view of the exhaust nozzle structure showing the structure in the thrust reversing position; and Fig. 5 is a transverse sectional view taken on line V—V of Fig. 1 and looking in the directions indicated by the arrows.

Referring to the drawings in detail, there is shown the aft end of an aviation turbojet engine 10 having exhaust nozzle structure 11 incorporated therein in accordance with the present invention. The engine 10 forms no part of the invention and may be of any suitable type. However, as well understood in the art, the engine is provided with a tubular casing 13 within which are disposed the various components of the engine including a bladed turbine rotor 14 and complementary stator vanes 15 through which gases formed within the engine by fuel combustion are partially expanded to drive the rotor 14. The remainder of the energy in the gases is utilized to provide a jet propulsive effect to the engine as the gases are ejected through a primary gas passageway 16, formed by the casing 13, and a primary exhaust nozzle 17 to the ambient atmosphere, as generally understood in the art. A generally conical fairing member 18, coaxially aligned with the rotor 14, may be provided in the passageway 16 to impart smooth flow characteristics to the gas stream after expansion in the rotor 14.

The engine casing 13 is elongated in rearward direction to form an afterburning chamber within the gas passageway 16 wherein fuel injected by suitable fuel injector nozzles 19 is burned to increase the propulsive effect of the gases ejected through the exhaust nozzle. Suitable flameholding devices 20 are also provided downstream of the fuel injectors 19 to anchor the fuel combustion flame formed during an afterburning period.

The engine casing 13 is encompassed by outer shell structure 21 of generally tubular shape, the outer shell being of sufficiently large diameter to jointly define with the engine casing 13 an annular bypass passageway 22 for the flow of air therethrough. The outer shell structure 21 includes a tubular shell 23 fixed to the engine casing by suitable struts and ejector shell structure 24 of tubular shape slidably received within the fixed shell for axial movement in fore and aft direction relative to the engine.

The ejector shell 24 is divided into two semi-cylindrical segments 25, the segments being hingeably connected at their juxtaposed aft ends to a pair of diametrically opposed arms 26 by hinge pins 27. The arms 26 extend forwardly in a direction parallel to the axis of the engine and are disposed externally of the engine casing 13. Each of the arms 26 is slidably received in guide mechanisms having two pairs of rollers 28 and is connected to a reciprocable power actuator 29 supported by the engine casing 13.

The forward juxtaposed ends of the ejector shell segments are pivotally connected by pins 30 to two pairs of diametrically opposed links 31, and each pair of links is connected to an actuator rod 32 which is carried by a second reciprocable actuator 33.

When the ejector shell structure 24 is in the position sown in Figs. 1 and 2, it forms a continuation of the bypass air passageway 22 to the atmosphere so that pressurized air is ejected through the passageway to the ambient air in an envelope encompassing the exhaust nozzle 17. Accordingly, a suitable annular seal member 35 may be provided between the shells 24 and 23 and attached to the latter to minimize air leakage therebetween.

The exhaust nozzle structure may be of any suitable variable area type. However, as illustrated, it has a plurality of mutually overlapping leaves 36 disposed in an annular array and defining an outlet 37 for the engine exhaust gases. The leaves 36 are hingeably connected to the engine casing 13 at their forward ends by pins 38 and movable by suitable power actuating mechanism 39 in radially inwardly direction to reduce the effective area of the exhaust outlet 37 and in radially outwardly direction to increase the area of the exhaust outlet.

As illustrated in Fig. 1, the exhaust nozzle structure 11 is in the non-afterburning position, at which time no fuel is injected into the afterburner chamber through the injector nozzles 19. In this position, the exhaust nozzle 17 is disposed with its leaves 36 in a converging position to reduce the effective area of the exhaust outlet 37, and the ejector shell structure 24 is in the retracted or forward position, so that the exhaust gases are ejected through the exhaust outlet 37 in somewhat conventional maner to provide an efficient propulsive effect to the engine.

However, when it is desired to operate the engine with afterburning, the ejector shell structure 24 is moved in rearward direction to the extended position illustrated in Fig. 2, by joint actuation of the actuators 29 and 33. In this position, the ejector shell structure extends rearwardly beyond the exhaust outlet 37. Concomitantly therewith the leaves 36 of the variable area exhaust nozzle are moved in radially outward direction by the actuator mechanism 39 to increase the area of the exhaust outlet 37, and fuel from a suitable source (not shown) is injected into the afterburner chamber through the fuel injectors 19 and ignited to provide additional volume to the propulsive gases. Also, during afterburning, pressurized air is admitted to the annular passageway 22 from a suitable source (not shown). As the exhaust gases are ejected through the exhaust outlet 37, expansion thereof is controlled within optimum limits by the air stream (indicated by arrows A) flowing through the ejector shell structure 24 in an annular envelop about the gas stream ejected from the exhaust nozzle. With this arrangement, nozzle efficiency of a relatively high order is provided with the engine in the afterburning position, so that, even though the engine develops sufficient thrust to propel the aircraft at supersonic speed during afterburning, performance is maintained at maximum efficiency.

When it is desired to revert the engine to the non-afterburning position shown in Fig. 1 from the afterburning position, the actuators 29 and 33 are actuated in a manner to retract or move the rods 26 and 32, respectively, in forward direction, thereby to move the ejector shell structure in upstream direction to the position shown in Fig. 1. Concomitantly therewith, the fuel supply to the fuel injectors 19 is shut off by suitable means (not shown) and the variable area exhaust nozzle 17 is moved to the reduced area position by the actuator mechanism 39.

When it is desired to reverse the thrust of the exhaust gases, for example during a landing operation to permit stopping the aircraft powered by the engine on a short runway, the exhaust nozzle structure is positioned as illustrated in Figs. 3 and 4. To attain this position, the actuators 29 and 33 are jointly actuated in a manner to extend the actuator rods 26 and 32 rearwardly sufficiently to rearwardly move the ejector shell structure 24 beyond the limits of the fixed outer shell 22, thereby freeing the ejector shell segments 25 therefrom. Immediately subsequent thereto, the movement of the actuator 29 is arrested while movement of the actuator 33 is continued, thereby permitting movement of the links 31 relative to the hinge pins 27 and rotating the segments 25 in opposite directions about the hinge pins through an angle of about 90° into end-to-end abutment with each other, as shown in Figs. 3 and 4. In this position, the ejector shell segments form an elongated semi-cylindrical barrier disposed in the path of the gases ejected by the exhaust nozzle 17 and provide lateral openings 40 through which the gases are directed, as illustrated by arrows B.

The ejector shell segments 25 are preferably provided with annular flanges 42 at their outer ends which serve to further direct the gas flow in a generally forward direction, to thereby effectively reverse the thrust of the gases.

When it is desired to restore the nozzle structure to the normal or forward thrust position, the actuators 33 are first operated in a manner to retract the actuator rods 32 until the segments 25 are rotated about the hinge pins 27 to the position shown in Fig. 2, and thereafter the actuators 29 and 33 are jointly operated to move the ejector shell structure into engagement with the fixed outer shell 23, thereby conditioning the nozzle structure for afterburning or non-afterburning operation as heretofore described.

It will now be seen that the invention provides exhaust nozzle structure for an aviation jet propulsion engine which is operable to permit afterburning as well as non-afterburning with optimum nozzle efficiency and further provides thrust reversing in a simple and highly reliable manner.

It will further be seen that the invention provides an exhaust nozzle structure in which performance of the nozzle is maintained at high efficiency by a variable ejector shell structure and in which the ejector shell is arranged and actuated in such a manner that thrust reversing may be obtained when desired without undue complication of the structure.

While the invention has been shown in but one form, it will be obvious to those skilled in the art that it is not so limited, but is susceptible of various changes and modifications without departing from the spirit thereof.

What is claimed is:

1. In an aviation jet propulsion engine, an inner tubular casing provided with an exhaust nozzle for ejecting hot gases to the atmosphere to provide a propulsive thrust to the engine, outer tubular shell structure encompassing said inner casing and disposed in concentrically spaced relation therewith, a tubular ejector shell structure, said ejector shell structure being disposed in said outer shell and including a pair of divided shell segments, means pivotally connecting said shell segments to each other adjacent juxtaposed portions thereof for rotation about an axis normal to the central axis of said exhaust nozzle, first actuator means for translating said shell segments in forward and rearward direction parallel to said central axis, said shell segments being movable in rearward direction beyond said exhaust nozzle and jointly providing a continuation of said outer shell, means for preventing rotation of said shell segments about said pivotal means during a portion of their rearward translatory travel, and second actuator means for rotatably actuating said shell segments in opposite directions about said pivotal means and into the path of the gases ejected by said exhaust nozzle, said second actuating means being effective when said rotation preventing means is ineffective to prevent rotation of said shell segments.

2. In an aviation jet propulsion engine, an inner tubular casing defining an afterburner combustion chamber and provided with an exhaust nozzle for ejecting hot gases to the atmosphere in a manner to provide a propulsive thrust to the engine, outer tubular shell structure encompassing said inner casing and disposed in concentrically spaced relation therewith, said outer shell structure being of substantially constant cross-sectional area throughout its length, said outer shell structure including a fixed tubular portion and a pair of divided shell segments disposed adjacent the downstream end thereof, means pivotally connecting said shell segments to each other adjacent juxtaposed downstream end portions thereof for joint rotation about an axis normal to the central axis of said exhaust nozzle, first actuator means for translating said shell segments axially beyond the outlet of said exhaust nozzle in upstream direction to a first position during non-afterburning operation of the engine and beyond the outlet of said exhaust nozzle in downstream direction to a second position during afterburning operation of the engine, said shell segments jointly providing a continuation of said fixed tubular portion beyond the outlet of said exhaust nozzle during movement from said first position to said second position, said shell segments being rotatable in opposite directions when in said second position across the path of the gases ejected by said exhaust nozzle and being effective to laterally deflect said gases, and means including a second actuator for rotating said shell segments in said second position.

3. In an aviation jet propulsion engine, an inner tubular casing, said inner casing having a variable area exhaust nozzle for ejecting hot gases to the atmosphere to provide a forward propulsive thrust to the engine, means including a first actuator for varying the area of said exhaust nozzle, an outer tubular shell in encompassing spaced relation with said inner casing, a tubular ejector shell structure slidably received in said outer shell for movement in axial direction, means including a second actuator for translating said ejector shell structure in upstream direction to a first position and in downstream direction to a second position, said ejector shell structure comprising a pair of juxtaposed segments jointly defining a tubular cylindrical passageway for rearwardly directing gases ejected by said exhaust nozzle and providing a continuation of said outer shell during movement from said first position to said second position, means pivotally connecting said segments together adjacent their downstream end portions for rotation about axes normal to the central axis of said exhaust nozzle, said segments being rotatable when in said second position across the path of the exhaust gases and being effective to laterally deflect said gases, and means including a third actuator for jointly rotating said segments.

4. In an aviation jet propulsion engine, an inner tubular casing defining an afterburner chamber, means for injecting fuel into said afterburner chamber, said inner casing having a variable area exhaust nozzle for ejecting hot gases to the atmosphere to provide a forward propulsive thrust to the engine, means including a first actuator connected to said inner casing for varying the area of said exhaust nozzle, an outer tubular shell in encompassing spaced relation with said inner casing and defining an annular flow passageway therewith, a tubular ejector shell structure slidably received in said outer shell for movement in axial direction, means including a second actuator for translating said ejector shell structure in upstream direction to a first position during non-afterburning and in downstream direction to a second position during afterburning, said ejector shell structure comprising a pair of juxtaposed segments jointly defining a tubular cylindrical passageway for rearwardly directing gases ejected by said exhaust nozzle and providing a continuation of said outer shell during movement from said first position to said second position, means including an arm pivotally connecting said segments together adjacent their downstream end portions for rotation about axes normal to the central axis of said exhaust nozzle, said second actuator being connected to said arm, said segments being rotatable across the path of the exhaust gases and being effective to laterally deflect said gases, and means including a pair of links and a third actuator for jointly rotating said segments, each of said links being connected at one end to said third actuator and at the opposite end to said segments.

References Cited in the file of this patent

UNITED STATES PATENTS

| | | |
|---|---|---|
| 2,715,312 | Brame | Aug. 16, 1955 |
| 2,803,944 | Kroon | Aug. 27, 1957 |
| 2,840,984 | Laucher | July 1, 1958 |
| 2,841,954 | Rainbow | July 8, 1958 |
| 2,874,538 | Laucher et al. | Feb. 24, 1959 |

FOREIGN PATENTS

| | | |
|---|---|---|
| 103,325 | Great Britain | Jan. 19, 1917 |